No. 685,944. Patented Nov. 5, 1901.
E. PRIDMORE.
HARVESTER.
(Application filed Aug. 15, 1901.)
(No Model.) 2 Sheets—Sheet 1.

Witnesses:
E. A. Volk
F. F. Schurzinger

Edward Pridmore, Inventor.
By Wilhelm Bonner Attorneys.

No. 685,944. Patented Nov. 5, 1901.
E. PRIDMORE.
HARVESTER.
(Application filed Aug. 15, 1901.)
(No Model.) 2 Sheets—Sheet 2.
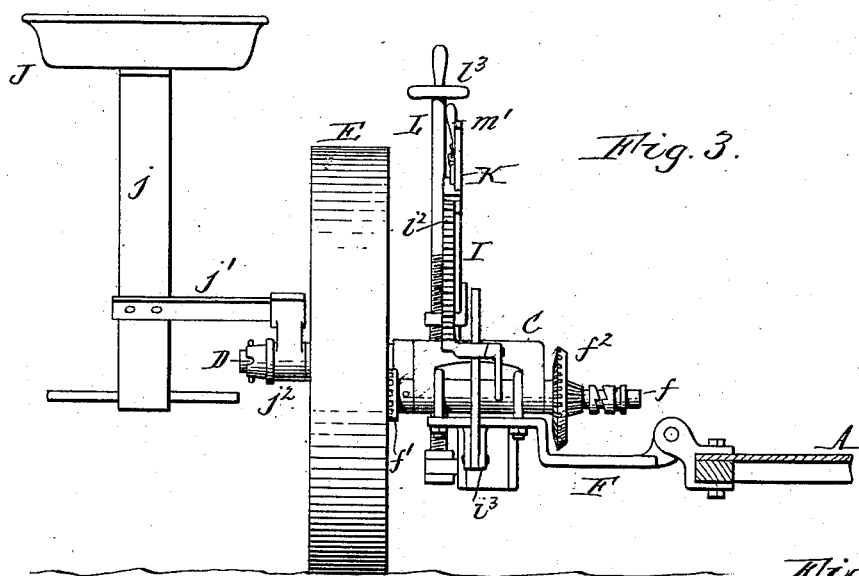
Fig. 3.
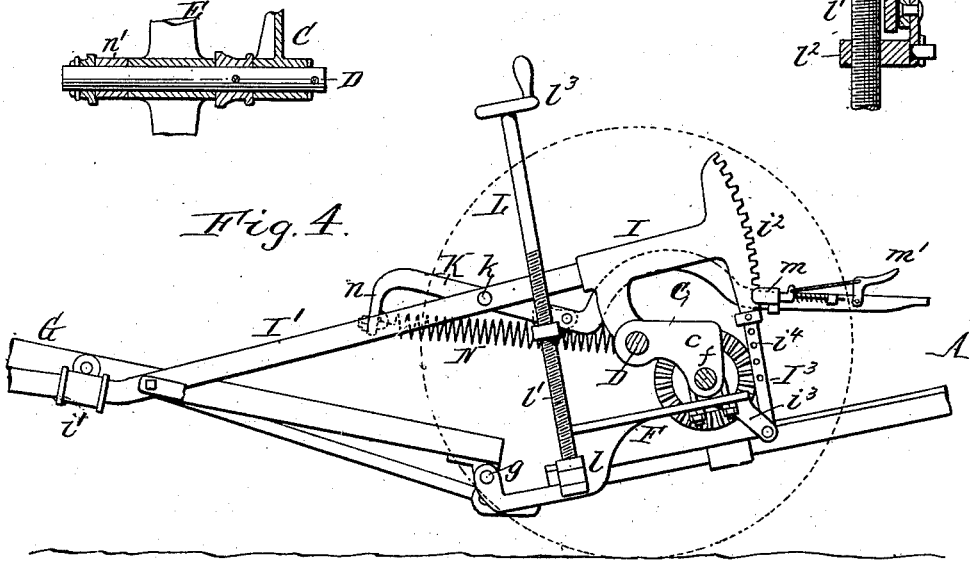
Fig. 5.
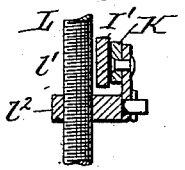
Fig. 6.
Fig. 4.
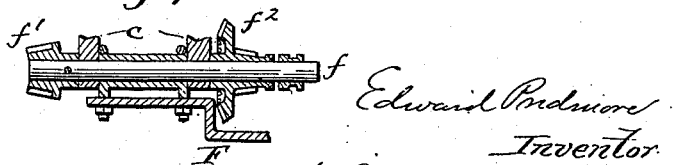
Fig. 7.
Witnesses:
E. A. Volk.
F. F. Schirzinger.
Edward Pridmore
Inventor
By Wilhelm Bonner
Attorneys.

UNITED STATES PATENT OFFICE.

EDWARD PRIDMORE, OF BATAVIA, NEW YORK, ASSIGNOR TO THE JOHNSTON HARVESTER COMPANY, OF BATAVIA, NEW YORK.

HARVESTER.

SPECIFICATION forming part of Letters Patent No. 685,944, dated November 5, 1901.

Application filed August 15, 1901. Serial No. 72,134. (No model.)

*To all whom it may concern:*

Be it known that I, EDWARD PRIDMORE, a citizen of the United States, and a resident of Batavia, in the county of Genesee and State of New York, have invented a new and useful Improvement in Harvesters, of which the following is a specification.

This invention relates to that class of harvesters which are provided with a tilting mechanism for raising and lowering the platform and finger-bar and with a spring which counterbalances the dead-weight of the platform and connecting parts and facilitates the raising and lowering of the same.

The object of this invention is to arrange the spring and tilting mechanism in such manner that the spring is protected and not liable to become entangled in the grain when the harvester is passing through the standing grain in starting cutting in a field or grain which drops from the rake, and, further, so that the spring exerts its force upon the tilting-lever in such a direction that it does not tend to tighten or bind the locking device of the lever, but leaves the locking device free to be easily released by the operator when the tilting-lever is required to be shifted for raising or lowering the platform and finger-bar.

Figure 1:
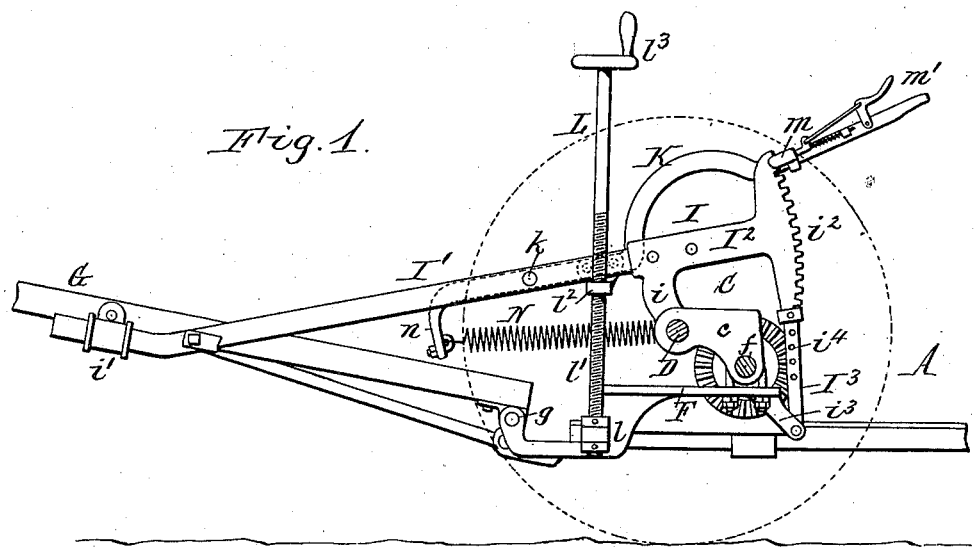
Figure 2:
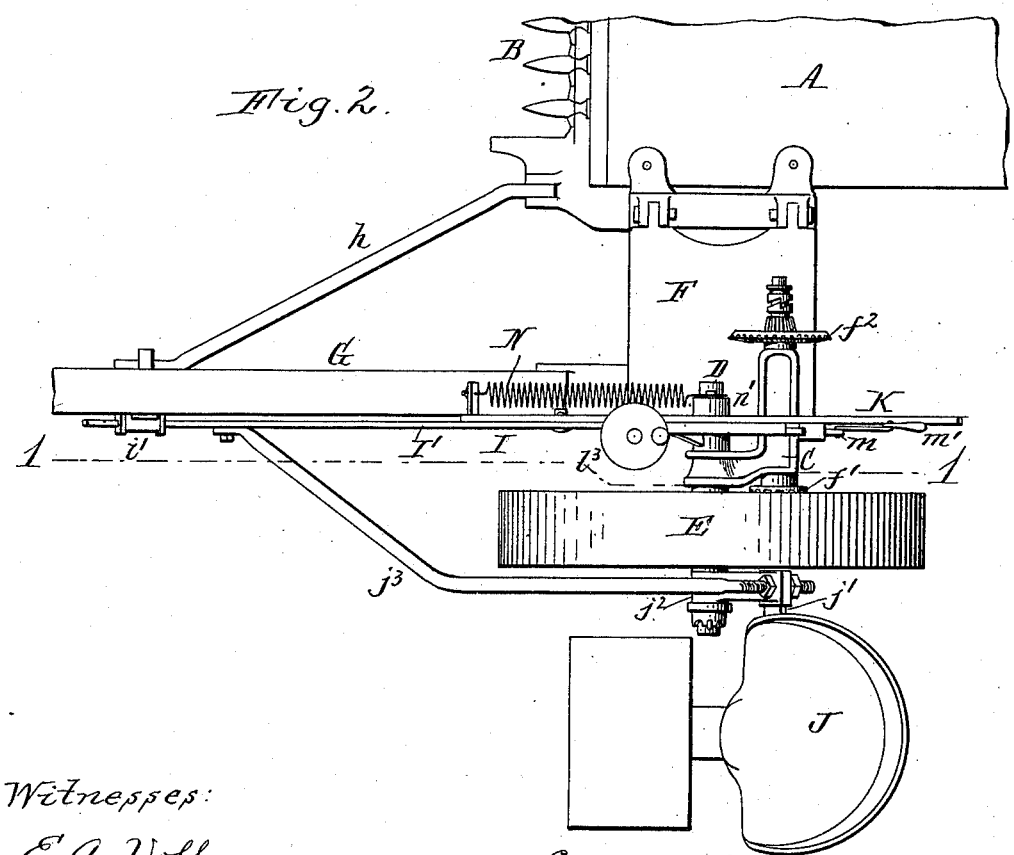

In the accompanying drawings, consisting of two sheets, Figure 1 is a fragmentary longitudinal vertical section in line 1 1, Fig. 2, of a harvesting-machine provided with my improvement, the figure showing the platform and finger-bar raised. Fig. 2 is a fragmentary top plan view of the same. Fig. 3 is a fragmentary rear elevation, partly in section. Fig. 4 is a vertical longitudinal section similar to Fig. 1, but showing the platform and finger-bar lowered. Fig. 5 is a transverse sectional elevation of the axle on which the master-wheel turns and controlling parts. Fig. 6 is a vertical transverse sectional view of the pivotal connection between the carrying-frame and the upright adjusting-screw. Fig. 7 is a vertical transverse section of the pivotal connection of the wheel-frame and gear-frame.

Like letters of reference refer to like parts in the several figures.

A represents the platform; B, the finger-bar; C, the wheel-frame, and D the axle or stud-shaft, secured in the wheel-frame and projecting both grainward and stubbleward therefrom.

E is the master-wheel, which is journaled on the axle D on the stubbleward side of the wheel-frame.

The wheel-frame C is provided with a rearwardly-extending yoke $c$, from which is hung in any suitable manner by a transverse pivotal connection the gear-frame F, which is located between the wheel-frame and the platform and connected to the latter, thus serving to pivotally connect the platform with and support the same from the wheel-frame. As represented in the drawings, this connection is made in the usual manner by the driving-shaft $f$, which gears with the master-wheel by a pinion $f'$ and drives the cutter mechanisms by a gear-wheel $f^2$.

G represents the pole, which is pivoted at $g$ to the forward end of the gear-frame F and preferably connected to the inner forward corner of the platform by a pivoted brace-rod $h$.

I indicates the carrying-frame, which is located longitudinally on the grainward side of the master-wheel above the wheel-frame and extends forwardly to the pole. This carrying-frame is mounted in any preferred manner so as to rock or oscillate with respect to the wheel-frame—for instance, by a depending arm $i$, mounted on the axle. The front portion of the carrying-frame consists of a bar I', which has its forward end arranged in a socket $i'$ on the pole, so as to be capable of sliding longitudinally therein. The rear portion of the carrying-frame consists of a casting I$^2$, which is provided with the pivot-arm $i$ and in rear of the latter with an upright toothed segment $i^2$. The rear end of the carrying-frame is connected to the rear end of the gear-frame by any suitable means—for instance, a link I$^3$, secured to the carrying-frame and pivoted to a rearwardly-projecting bracket $i^3$ on the gear-frame. The connection is preferably adjustable, for which purpose the link is shown as having holes $i^4$, in either of which a pin on the carrying-frame is engaged.

J represents the seat; $j$, the seat standard or spring; $j'$, the arm to which the seat-spring is secured; $j^2$, the socket which supports this arm and which is mounted on the stubbleward end of the axle, and $j^3$ a brace which extends from the front portion of the carrying-frame to the socket $j^2$. The seat may, however, be supported in any other suitable manner.

K indicates the tilting-lever, which is fulcrumed at $k$ to the carrying-frame and extends rearwardly to a point within easy reach of the rider's seat. The lever is connected with the gear-frame F in front of the axle, preferably, as shown in the drawings, by an upright rod L, connected at its lower end to the gear-frame at $l$ and having a screw-threaded portion $l'$, working in a screw-threaded nut $l^2$, pivoted or swiveled to the tilting-lever K. The rod L is provided at its upper end with a crank $l^3$ for turning the rod in the nut to adjust the gear-frame toward or from the lever.

$m$ represents the locking-bolt of the tilting-lever, which engages with the toothed segment $i^2$ and is operated by the usual handle $m'$.

All of the parts are, so far as described, of ordinary and well-known construction and operate as follows: When it is desired to lower the platform and finger-bar from the raised position shown in Fig. 1, the tilting-lever is moved downwardly, which movement through the medium of the connecting-rod L throws the forward end of the gear-frame F downward relative to the carrying-frame and rearward, the connecting-bar I' being permitted to slide forward in its connection with the pole. The parts are held in the lowered position, which is shown in Fig. 4, by the engagement of the locking-pawl with the notched segment. The finger-bar is raised to the position indicated in Fig. 1 or any desired intermediate point by lifting the rear end of the tilting-lever.

N indicates the counterbalancing-spring, which is connected at its forward end to the downwardly-bent front portion $n$ of the tilting-lever and secured at its rear end to some relatively fixed part of the wheel-frame, such as the axle D. As shown in the drawings, the rear end of the spring is connected with a collar $n'$, which is mounted on the grainward end of the axle D. This arrangement of the spring causes the latter to occupy a position below the connecting-frame I and below the tilting-lever. The spring is therefore protected by these parts from falling grain—such, for instance, as might be dropped by the rake usually employed with harvesting-machines or such as might fall in driving the machine through the standing grain in starting cutting in a large field. Furthermore, the described arrangement of the spring causes the latter to exert its tension on the tilting-lever in a rearward direction, which tends to ease the locking-bolt of the lever in the segment and renders it comparatively easy to release the bolt preparatory to shifting the lever, while a forward pressure of the spring on the lever and bolt in the construction heretofore employed tends to bind the bolt in the segment and increases the labor necessary for releasing the locking device.

I claim as my invention—

1. The combination of a wheel-frame, a gear-frame pivotally connected to the wheel-frame, a pole connected to the gear-frame, a longitudinal carrying-frame arranged above the wheel-frame and pivotally connected thereto and also connected at its front end with the pole and at its rear end with the gear-frame, a tilting-lever pivoted to the carrying-frame and connected with the gear-frame, and a counterbalancing-spring arranged below the tilting-lever and carrying-frame and extending from the front end of said lever rearwardly to a support on the wheel-frame, substantially as set forth.

2. The combination of a wheel-frame having a fixed axle, a gear-frame hung to said axle, a pole connected to the gear-frame, a longitudinal carrying-frame arranged above the wheel-frame and pivoted to said axle and connected at its front end with the pole and at its rear end with the gear-frame, a tilting-lever pivoted to the carrying-frame and having its front end depending below the same, a connection extending from the tilting-lever to the gear-frame, a counterbalancing-spring arranged below the tilting-lever and carrying-frame and extending from the front end of said lever rearwardly, and a collar which is mounted on said axle and connects the rear end of said spring with the wheel-frame, substantially as set forth.

Witness my hand this 12th day of August, 1901.

EDWARD PRIDMORE.

Witnesses:
 E. A. FARRALL,
 D. W. SPENCER.